United States Patent [19]

Rees et al.

[11] 4,230,442
[45] Oct. 28, 1980

[54] MOLD-CLAMPING MECHANISM FOR INJECTION-MOLDING MACHINE

[75] Inventors: Herbert Rees, Willowdale; Allan H. Robinson, Mississauga, both of Canada

[73] Assignee: Husky Injection Molding Systems Limited, Bolton, Canada

[21] Appl. No.: 68,497

[22] Filed: Aug. 21, 1979

[51] Int. Cl.$^2$ .......................... B29C 1/16; B29F 1/00
[52] U.S. Cl. ................. 425/451.2; 425/150; 425/590; 425/595
[58] Field of Search ............... 425/150, 451.2, 450.1, 425/451.9, 590, 595

[56] References Cited
U.S. PATENT DOCUMENTS

| | | | |
|---|---|---|---|
| 3,156,014 | 11/1964 | Wenger | 425/595 X |
| 3,263,277 | 8/1966 | Ohlendorf et al. | 425/451.2 |
| 3,270,372 | 9/1966 | Hesse | 425/451.2 |
| 4,017,236 | 4/1977 | Perkman et al. | 425/150 |

*Primary Examiner*—J. Howard Flint, Jr.
*Attorney, Agent, or Firm*—Karl F. Ross

[57] ABSTRACT

A thrust member on column secured to a movable platen of an injection-molding machine, surrounded by a mounting frame with laterally withdrawable shutters which enter behind the thrust member in the terminal phase of a mold-closing stroke for transmitting to the thrust member a supplemental clamping force, is linked with a hydraulically actuated plunger or driving piston via a lost-motion coupling. The clamping force is supplied through one or more annular pistons received in respective cylinder chambers of a stationary housing linked via tie rods with a fixed platen. Upon the release of the clamping force, a counter-vailing hydraulic force is developed between the column and the driving piston, whose forward displacement is limited by a fixed abutment, to break open the mold with a larger hydraulic force. The annular clamping pistons remain spaced from the adjoining housing walls in their retracted positions to allow for an extra rearward shift if, through a malfunction, the shutters are trapped between their mounting frame and the column.

5 Claims, 3 Drawing Figures

| SOLENOID | $t_1$ | $t_2$ | $t_3$ | $t_4$ | $t_5$ | $t_6$ | $t_7$ |
|---|---|---|---|---|---|---|---|
| 204 | X | X | X | X | X | O | O |
| 230 | O | O | O | O | O | X | O |
| 238 | O | X | X | X | O | O | O |
| 232 | X | O | O | O | X | X | O |
| 217 | O | O | X | O | O | O | O |
| 234 | O | O | O | X | O | O | O |
| 236 | O | O | O | X | O | O | O |
| 212 | O | O | O | O | O | X | O |

FIG. 3

MOLD-CLAMPING MECHANISM FOR INJECTION-MOLDING MACHINE

FIELD OF THE INVENTION

Our present invention relates to an injection-molding machine equipped with a mold-clamping mechanism designed to apply supplemental pressure to a mold held closed between two relatively movable platens.

BACKGROUND OF THE INVENTION

In commonly owned U.S. Pat. No. 4,017,236 there has been disclosed an injection-molding machine of this type which has a piston head hydraulically reciprocated within a cylinder and a piston rod secured to a tubular thrust member or column axially surrounding that rod, the thrust member being rigid with the movable platen which is guided by the usual tie bars. When this platen is advanced by the hydraulically operated driving piston or plunger into a forward position in which the mold is nearly closed, a pair of force-transmitting elements or shutters move in behind the column and are in turn pressurized by a cascade of ancillary pistons received in annular cylinder chambers of a stationary housing. The patent also describes a so-called mold-breaking action, i.e. an initial separation of the mold plates carried by the platens after the injection of thermoplastic material into the mold, involving the admission of hydraulic liquid to an annular face on a peripheral formation or head of the main cylinder which for this purpose is limitedly axially shiftable in the housing.

With molding machines having a long stroke, the axial mobility of the correspondingly lengthened main cylinder may give rise to problems in maintaining that cylinder precisely parallel to the tie bars.

Another problem sometimes encountered in a molding machine of this description is the danger of jamming in the event of failure of the supply of hydraulic liquid (referred to hereinafter, for convenience, as oil) to the annular housing chamber of chambers containing the ancillary piston or pistons of the mold-clamping mechanism. If these pistons are not properly pressurized to complete the closure of the mold, the injected plastic material may drive the mold plates apart and wedge the shutters in their operating position between the column and the housing. If the ancillary pistons make metal-to-metal contact with the rear walls of their chambers in their retracted position, the shutters could not be released by oil pressure and could be liberated only by destructive measures such as cutting off the retaining nuts of the tie bars.

OBJECTS OF THE INVENTION

Thus, the general object of our present invention is to provide improved clamping and unclamping means in such an injection-molding machine in order to obviate the problems discussed above.

A more particular object is to provide mold-breaking means compatible with a stationary main cylinder yet capable of exerting a rearwardly acting axial force substantially greater than that available from the admission of oil into the annular space surrounding the piston rod within the cylinder.

Another more specific object is to prevent metal-to-metal contact between one or more ancillary pistons and the associated chamber wall or walls in the unoperated state of the mold-clamping mechanism.

SUMMARY OF THE INVENTION

In accordance with an important feature of our invention, the thrust member or column rigid with the movable platen is connected with its driving piston or plunger via a lost-motion coupling enabling the clamping means to impart an extra forward motion to that thrust member in an advanced position of the driving piston but independently of the latter, within the limits of relative displaceability afforded by the lost-motion coupling, to complete the establishment of the mold-closed position. The mold-breaking effect is achieved with the aid of unclamping means hydraulically operable in the mold-closed position for subjecting the column to a rearward displacement relative to the driving piston while that piston is forced against a fixed stop.

Pursuant to another feature of our invention, we provide blocking means synchronized with control means for the selective admission of high-pressure fluid (oil) to the rear and front faces of an ancillary piston of the mold-clamping mechanism for stopping the outflow of the fluid from the rear port of the associated cylinder chamber upon the return of that ancillary piston to its withdrawn position so as to maintain a residual fluid cushion in that chamber, in combination with overriding means manually operable to drain off that cushion for enabling a further withdrawal of the ancillary piston in the event of an emergency.

BRIEF DESCRIPTION OF THE DRAWING

The above and other features of our invention will now be described in detail with reference to the accompanying drawing in which:

FIG. 3 shows a timing diagram related to the operation of the system of FIGS. 1 and 2.

SPECIFIC DESCRIPTION

Figure 1:
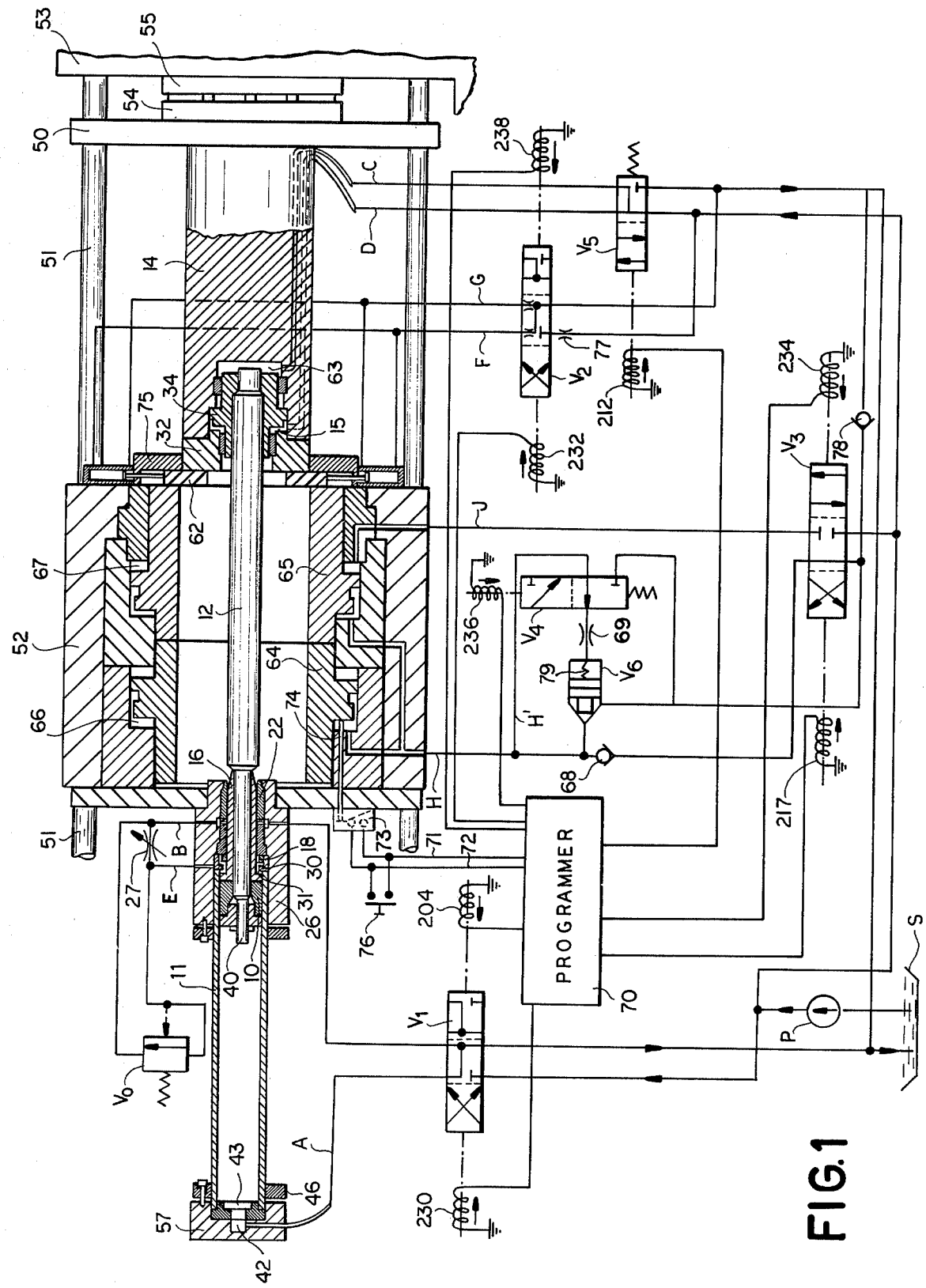
FIG. 1 diagrammatically illustrates the principal mechanical and hydraulic components of an injection-molding machine embodying our invention.
Figure 2:
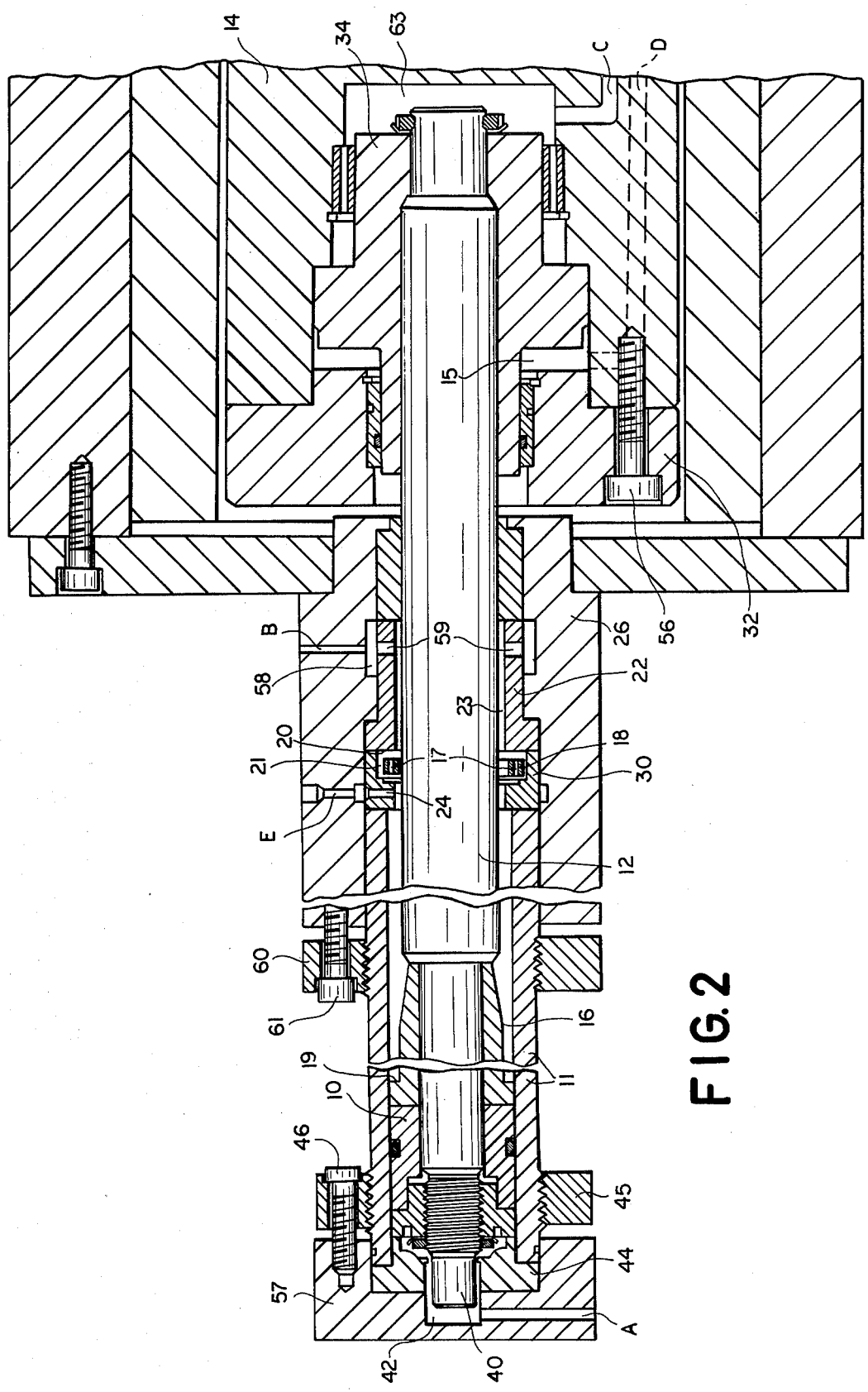
FIG. 2 shows in greater detail a portion of the mechanism of FIG. 1 including a driving piston or plunger for the movable platen and a lost-motion coupling between that piston and an associated column or thrust member.

In FIGS. 1 and 2 we have shown part of an injection-molding machine generally similar to that illustrated in prior U.S. Pat. No. 4,017,236. The machine comprises an elongate hydraulic cylinder 11 accommodating a piston head 10 from which a piston rod 12 extends forward into engagement with a thrust member or column 14 which is rigid with a movable platen 50 sliding on tie bars 51. These tie bars are anchored to a stationary housing 52 and to a fixed platen 53, the two platens carrying respective mold portions 54, 55 which closely approach each other in the advanced piston position of FIG. 1. Piston rod 12 terminates in another, larger head 34 received with limited axial play in a recess existing between column 14 and an end cap 32 secured to that column by screws 56, only one such screw being illustrated in FIG. 2. Thus, head 34 forms with thrust member or column 14 a lost-motion coupling which in FIGS. 1 and 2 is shown to leave a small axial gap 15 between that head and cap 32.

Housing 52 is part of the machine frame which also forms a reinforcing jacket 26 about a forward end of cylinder 11 and a mounting 57 for the opposite end of that cylinder. This mounting has an axial bore 42 with a constricted mouth 43 formed by an insert 44 which is clamped in place by the cylinder 11 with the aid of a nut 45 and retaining screws 46 (only one shown). Insert 44, which constitutes an abutment for piston head 10 in the retracted position of the latter, may thus be replaced by one of greater axial length to foreshorten the piston stroke if desired. The piston 10, 12 terminates at its rear end in a boss 40 entering the mouth 43 of bore 42 at the end of the return stroke. Bore 42 communicates with a conduit A, forming part of the associated hydraulic system more fully described hereinafter, through which oil is admitted into the left-hand end of cylinder 11 by means of a pump P and a valve $V_1$ (FIG. 1), controlled by two solenoids 204, 230, to drive the piston forward; when the valve $V_1$ connects the conduit A to a sump S during the return stroke, the entry of boss 40 into mouth 43 in the terminal phase of that stroke restricts the outflow of the oil remaining in cylinder 11 to the left of piston head 10 so as to exert a braking effect upon it. In practice, therefore, the illustrated position of contact between piston head 10 and insert 44 need not be reached during steady-state operation.

Another conduit B extends from valve $V_1$ to an annular groove 58 within jacket 26 communicating via ports 59 of a bushing 22 and an annular space 23 with the interior of cylinder 11 at its front end. The cylinder, held against jacket 26 by a nut 60 and screws 61 in a manner analogous to that described with reference to mounting 57, abuts at that end the bushing 22 through the intermediary of an annular spacer 30 which defines with a face 20 of bushing 22 a recess 21 accommodating a floating shutter ring 18. This ring has several axial passages 17 and is received in recess 21 with limited axial and radial clearances (exaggerated in FIG. 2), e.g. of about 1 mm and 0.25 mm, respectively. When the driving piston 10, 12 moves forward from its withdrawn position shown in FIG. 2, upon pressurization of conduit A, oil present in cylinder 11 forwardly of piston head 10 can escape against little resistance through the passages 17 and/or the central bore of floating ring 18 as well as annular space 23, ports 59 and groove 58, communicating with conduit B, even if that ring is carried by the pressure differential into contact with face 20 of bushing 22. Piston rod 12, however, is provided at an intermediate zone with a tapering portion 16 which enters the floating ring 18 and centers it when the piston approaches its advanced position of FIG. 1, thereby obstructing the central bore of that ring and disaligning its passages 17 from space 23 so that the oil remaining between piston head 10 and bushing 22 can escape only through a restricted path comprising an alternate exit port 24 in spacer 30, an extension thereof in jacket 26 forming part of a conduit E, and an adjustable throttle 27 interconnecting conduits E and B. Throttle 27 is shunted by a pressure-relief valve $V_0$ (FIG. 1). The additional hydraulic pressure generated by the obstruction of conduit B is absorbed by the reinforcing jacket 26.

Thus, the forward motion of piston 10, 12 is significantly slowed in its terminal phase as a shoulder 19 of the piston moves into the position of FIG. 1 in which that shoulder is separated from spacer 30 by a small gap 31 of, say, 5 mm allowing for a minor further advance of the piston by a fraction of the gap width during the subsequent clamping operation which may result in a stretching of the tie bars by about 2 to 3 mm.

This clamping operation is performed, according to the teaching of prior U.S. Pat. No. 4,017,236, with the aid of two lateral shutters 62 displaceable under oil pressure from a conduit F between housing 52 and cap 32 of thrust member or column 14 when, with the piston 10, 12 in the advanced position of FIG. 1, that thrust member or column 14 is moved further to the right by oil entering a space 63 through a conduit C so as to eliminate the gap 15. A stack of ancillary annular pistons 64, 65, received in respective cylinder chambers 66, 67 of housing 52, is then advanced by oil pressure from a conduit H to exert a clamping force upon the two touching mold portions 54, 55 through the intermediary of shutters 62, cap 32, column 14 and platen 50. Conduits F and G terminate at hydraulic cylinders carried on a mounting frame 75 surrounding the cap 32.

After the injected plastic material has sufficiently hardened, thrust member or column 14 is released by pressurization of a conduit J to drive the stacked pistons 64, 65 back from the shutters 62 which are thereupon retracted by oil pressure in conduit G. The mold portions 54, 55 can now be separated by a mold-breaking operation as a conduit D terminating at the interface of cap 32 and head 34 is pressurized with concurrent draining of conduit C to reopen the gap 15. This operation results, at first, in the complete elimination of gap 31 whereby shoulder 19 of piston rod 12 comes to rest against spacer 30. With the piston thus arrested in its rightmost position, the oil pressure in conduit D retracts the column 14 together with platen 50 preparatorily to a withdrawal of piston 10, 12 by the admission of oil into ports 59 and space 23 via conduit B. This oil pressure separates the floating shutter ring 18 from bushing 22 so as to let the oil re-enter the cylinder 11 from the front and restore the position of FIG. 2.

The pressurization of conduits C and D is controlled by a spring-loaded valve $V_5$ which is shiftable by a solenoid 212 from its illustrated position. Two solenoids 232, 238 operate a three-position valve $V_2$, similar to valve $V_1$, controlling the pressurization of conduits F and G. Another such valve $V_3$ provided with solenoids 217, 234 lies in series with conduits H and J but the return flow from chambers 66 and 67 via conduit H is blocked by a check valve 68 so that on unclamping the oil must exit from these chambers by way of a pressure-regulating valve $V_6$ whose loading spring 79 is aided by hydraulic pressure from a branch H' of conduit H admitted to a biasing inlet of that valve through a spring-loaded control valve $V_4$ in series with a throttle 69. Valve $V_4$ is shiftable from its illustrated normal position by a solenoid 236. The illustrated central position of valves $V_1$, $V_2$ and $V_3$ is established by biasing springs, not shown, in the usual manner.

All solenoids 204, 212, 217, 230, 232, 234, 236 and 238 are selectively, energizable, in a predetermined sequence, by a programmer 70 which may comprise a set of electromagnetically operated contacts or an electronic switching matrix. Programmer 70 is further provided with two leads 71, 72 which are interconnected in the mold-clamping position by a monitoring switch 73 mounted on housing 52, this switch being otherwise held open by a sensing stud 74 coacting with piston 64. Monitoring switch 73 may, however, be short-circuited by a manual overriding switch 76 in the case of an abnormal condition.

FIG. 3 represents the operating cycle of programmer 70, shown to be divided into seven phases (not necessarily of equal duration) $t_1-t_7$.

In the first phase $t_1$, solenoids 204 and 232 are energized to initiate a mold-closing stroke, with oil from pump P entering conduits A and B simultaneously via valve $V_1$ while shutters 62 are held retracted by the pressurization of conduit G by way of valve $V_2$ in series with a throttle 77. Solenoid 204 continues energized through phase $t_5$ to hold the valve $V_1$ in its left-hand position; the area of piston head 10 under pressure from the oil admitted through conduit A exceeds the annular area around piston rod 12 pressurized by the oil entering via conduit B. The relatively small pressure differential thus available suffices to drive the piston to the right as viewed in FIGS. 1 and 2.

At the end of phase $t_1$ the piston has reached its advanced position of FIG. 1. With solenoid 212 still unoperated, valve $V_5$ has remained under spring force in its illustrated position in which oil under pressure enters both conduits C and D; since the space 63 communicating with conduit C in column 14 has a larger area than the annular face bounding the gap 15 at the end of conduit D, there also exists a pressure differential which moves the column 14 forward beyond the position of FIG. 1 to eliminate the gap 15 and to close the mold 54, 55. This advance of the column 14 into a nonillustrated position initiates phase $t_2$.

In this second phase, solenoid 238 is energized in lieu of solenoid 232 to reverse the position of valve $V_2$ whereby the throttled oil flow from pump P enters conduit F with concurrent draining of conduit G to the sump S. The shutters 62 are now displaced inward into their working position behind end cap 32, as shown in FIG. 1. This shutter position is maintained through phase $t_4$.

With the shutters thus inserted, as determined by a limit switch or by a timer inside programmer 70, solenoid 217 is energized in phase $t_3$ to shift the valve $V_3$ to the right. Pump pressure is now applied via check valve 68 to conduit H whereby the stacked pistons 64, 65 are displaced together with shutters 62 toward thrust member or column 14 to exert a clamping force upon the mold; this results in closure of monitoring switch 73. Liquefied plastic material is now admitted into the mold in the usual manner, via a nonillustrated runner structure terminating at mold portion 55, under the direct or indirect control of programmer 70.

After the necessary hardening period, unclamping begins in phase $t_4$ by the energization of solenoids 234 and 236 with concurrent de-energization of solenoid 217. Spring-loaded valve $V_4$, which in its illustrated normal position has up to now prevented the escape of oil from chambers 66 and 67 by blocking the ancillary valve $V_6$, is now moved into its alternate position in which the hydraulic back pressure acting upon the plunger of valve $V_6$ is relieved as the oil behind that plunger escapes via throttle 69 and a check valve 78 to the sump S. Thus, chambers 66 and 67 can be drained by way of valve $V_6$, as conduit J is pressurized by valve $V_4$ in its left-hand position, against the throttling actions of spring 79, until the restoration of pistons 64 and 65 to their starting position reopens the monitoring switch 73.

At this instant, programmer 70 establishes phase $t_5$ in which solenoid 232 is energized in place of solenoid 238 while solenoids 234 and 236 are deactivated to restore the valve $V_3$ to its central position cutting off the conduit J from both the pump P and the sump S. Solenoid 232 shifts valve $V_3$ to the right so as to pressurize the conduit G in lieu of conduit F, thereby retracting the shutters 62. The return of valve $V_4$ to its normal position reblocks the valve $V_6$ to preserve an oil cushion in chambers 66 and 67.

In the following phase $t_6$, solenoid 232 remains operated while solenoid 230 is energized in lieu of solenoid 204, as is solenoid 212. The latter shifts the valve $V_5$ into its alternate position in which conduit C is drained and conduit D remains pressurized to reopen the gap 15 within column 14. With gap 31 still providing a residual axial clearance, piston rod 12 moves further to the right to eliminate this latter gap completely while column 14 is held in position by the cohesion of the mold portions 54, 55. When shoulder 19 of piston rod 12 contacts the annular spacer 30, however, the piston rod is immobilized so that column 14 must yield under the pressure of the oil in gap 15 acting upon an area much larger than that available to the oil which at this point enters the ports 59 via conduit B even as conduit A is drained in the right-hand position of valve $V_1$. Thus, the mold is broken open and the oil from conduit B can now return the piston and the column toward their withdrawn position shown in FIG. 2.

In the final phase $t_7$, marked by the full opening of the mold, programmer 70 de-energizes all the solenoids so that valves $V_1$–$V_5$ remain in or return to their illustrated positions under the control of their respective biasing springs.

The position of column 14 illustrated in FIG. 1 is an abnormal one in which, owing to insufficient oil pressure in chambers 66 and 67 during phase $t_3$, the admission of plastic material into the mold cavity or cavities has driven the mold portions 54, 55 apart so as to wedge the shutters 62 between the cap 32 of column 14 and the stacked pistons 64, 65. With monitoring switch 73 reopened prematurely by the repression of the column, programmer 70 cannot advance to phase $t_5$ for retraction of the shutters 62. Instead, an alarm is flashed. After reclosure of the injection orifice leading to mold portion 55, the operator may manually close the overriding switch 76 to allow the complete draining of chambers 66, 67 and retraction of the shutters 62 in a delayed phase $t_4$. The mold can then be reopened in the manner described above with reference to program phase $t_6$.

We claim:

1. In an injection-molding machine provided with a fixed platen, a movable platen and actuating means for reciprocating said movable platen along an axis with reference to said fixed platen between a mold-open and a mold-closed position,
the improvement wherein said actuating means comprises:
a stationary cylinder provided with a driving piston reciprocable under pressure of a hydraulic liquid admitted into said cylinder;
a thrust member rigid with said movable platen and connected with said driving piston by a lost-motion coupling;
clamping means operable in an advanced position of said driving piston, with said movable platen approaching said mold-closed position, to impart an extra forward motion to said thrust member independently of said driving piston within the limits of relative displaceability provided by said lost-motion coupling to complete the establishment of said mold-closed position; and
unclamping means hydraulically operable in said mold-closed position for subjecting said thrust member to a rearward displacement relative to said driving piston while forcing the latter against a fixed stop, thereby separating said mold portions from each other preparatorily to a retraction of said driving piston together with said thrust member by said hydraulic liquid.

2. The improvement defined in claim 1 wherein said driving piston comprises a piston head in said cylinder and a piston rod projecting forward from said cylinder into engagement with said thrust member while defining with said piston head an annular area available for the exertion of rearward pressure by said hydraulic liquid, said piston rod and said thrust member being provided with confronting faces having an effective area larger than said annular area, said unclamping means including a valve for admitting hydraulic liquid to a space bounded by said confronting faces.

3. The improvement defined in claim 2 wherein said cylinder is provided with a floating shutter engageable by said piston rod in a forward position thereof for partly blocking the outflow of hydraulic liquid from said cylinder in a final phase of piston advance.

4. The improvement defined in claim 1, 2 or 3 wherein said clamping means comprises a stationary housing forming at least one cylinder chamber provided with a rear port and a front port, ancillary piston means in said cylinder chamber, force-transmitting means interposable between said ancillary piston means and said thrust member in said advanced position of said driving piston, control means for selectively admitting a high-pressure fluid to said rear and front ports to displace said ancillary piston means betweens a withdrawn position and an extended position, blocking means synchronized with said control means for stopping the outflow of said fluid from said rear port upon a return of said ancillary piston means to said withdrawn position to maintain a residual fluid cushion in said cylinder chamber, and overriding means manually operable to drain off said fluid cushion for enabling a further withdrawal of said ancillary piston means.

5. The improvement defined in claim 4 wherein said blocking means comprises a spring-loaded valve in a fluid line connected to said rear port, said control means including a further valve operable to admit high-pressure fluid to a biasing inlet of said spring-loaded valve in aiding relationship with the spring force thereof.

* * * * *